United States Patent
Dolev et al.

(10) Patent No.: US 9,406,030 B2
(45) Date of Patent: Aug. 2, 2016

(54) SYSTEM AND METHODS FOR COMPUTERIZED MACHINE-LEARNING BASED AUTHENTICATION OF ELECTRONIC DOCUMENTS INCLUDING USE OF LINEAR PROGRAMMING FOR CLASSIFICATION

(75) Inventors: Guy Dolev, Herzliya (IL); Sergey Markin, Herzeliya (IL); Avi Bar-Nissim, Hod Hasharon (IL); Asher Uziel, Modiin (IL)

(73) Assignee: AU10TIX LIMITED, Nicosia (CY)

( * ) Notice: Subject to any disclaimer, the term of this patent is extended or adjusted under 35 U.S.C. 154(b) by 282 days.

(21) Appl. No.: 14/235,658

(22) PCT Filed: Jul. 23, 2012

(86) PCT No.: PCT/IL2012/050265
§ 371 (c)(1),
(2), (4) Date: Jan. 28, 2014

(87) PCT Pub. No.: WO2013/014667
PCT Pub. Date: Jan. 31, 2013

(65) Prior Publication Data
US 2014/0180981 A1      Jun. 26, 2014

Related U.S. Application Data

(60) Provisional application No. 61/512,487, filed on Jul. 28, 2011.

(51) Int. Cl.
*G06F 15/18* (2006.01)
*G06N 99/00* (2010.01)
(Continued)

(52) U.S. Cl.
CPC .......... *G06N 99/005* (2013.01); *G06K 9/00442* (2013.01); *G06K 9/6276* (2013.01)

(58) Field of Classification Search
CPC combination set(s) only.
See application file for complete search history.

(56) References Cited

U.S. PATENT DOCUMENTS

| 6,064,767 | A  | * | 5/2000 | Muir  | G06K 9/6821 382/177 |
| 7,877,677 | B2 | * | 1/2011 | Wyler | H04L 67/42 715/209  |

(Continued)

FOREIGN PATENT DOCUMENTS

| WO | 2011/058553 A2 | 5/2011 |
| WO | 2011/058554 A1 | 5/2011 |

OTHER PUBLICATIONS

Wang et al. "Large-Margin Structured Prediction via Linear Programming" Proceedings of the 12th International Conference on Artificial Intelligence and Statistics (AISTATS), 2009.*

(Continued)

*Primary Examiner* — Michael B Holmes
(74) *Attorney, Agent, or Firm* — Hauptman Ham, LLP (57) ABSTRACT

Electronic document classification comprising providing training documents sorted into classes; linear programming including selecting inputs which maximize an output, given constraints on inputs, the output maximized being a difference between: a. first estimated probability that a document instance will be correctly classified, by a classifier corresponding to given inputs, as belonging to its own class, and b. second estimated probability that document instance will be classified, by the classifier, as not belonging to its own class; and classifying electronic document instances into classes, using a preferred classifier corresponding, to the inputs selected by the linear programming. A computerized electronic document forgery detection method provides training documents and uses a processor to select value-ranges of non-trivial parameters, such that selected values-range(s) of parameters are typical to an authentic document of given class, and atypical to a forged document of same class.

23 Claims, 4 Drawing Sheets

(51) Int. Cl.
*G06K 9/00* (2006.01)
*G06K 9/62* (2006.01)

(56) References Cited

U.S. PATENT DOCUMENTS 8,739,027 B2 * 5/2014 Wyler ............... G06F 17/30905
715/238
9,081,988 B2 * 7/2015 Dolev ..................... G06F 21/64

OTHER PUBLICATIONS

Construction Enterprises Bidding Decision-Making Based on Linear Programming L. Jian-Bing Database Technology and Applications, 2009 First International Workshop on Year: 2009 pp. 646-649, DOI: 10.1109/DBTA.2009.86 IEEE Conference Publications.*

Evolving Recurrent Linear-GP for Document Classification and Word Tracking Xiao Luo; A. N. Zincir-Heywood Evolutionary Computation, 2006. CEC 2006. IEEE Congress on Year: 2006 pp. 2436-2443, DOI: 10.1109/CEC.2006.1688611 IEEE Conference Publications.*

A game theory approach to pairwise classification with support vector machines M. Petrovskiy Machine Learning and Applications, 2004. Proceedings. 2004 International Conference on Year: 2004 pp. 115-122, DOI: 10.1109/ICMLA.2004.1383502 IEEE Conference Publications.*

Learning the weight of the query term from the relevance feedback B. Wang; Y. Zhou; Q. Zhang; X. Huang Natural Language Processing andKnowledge Engineering (NLP-KE), 2011 7th International Conference on Year: 2011 pp. 43-50, DOI: 10.1109/NLPKE.2011.6138167 IEEE Conference Publications.* http://idscan.co.uk/, "Fake? Forged? Do you know? IDscan™ does.," Aug. 21, 2014, Idscan Biometrics Ltd.

https://www.bundesdruckerei.de/en/762-full-id-border, "Full ID Border, Solution for secure and efficient border control," Feb. 22, 2015, Bundesdruckerei GmbH.

http://www.assuretec.com/solution/counterfeit-id-detection, "Can You Spot a Fake ID?," May 24, 2014, Assuretec.

http://www.assuretec.com/sites/default/files/counterfeit_solutions.pdf, "Call to Action: The Growing Epidemic of Counterfeit Identity Documents and Practical Steps to Combat it," Jan. 2012, Document Security Alliance.

https://www.jumio.com/fastfill/supported-countries, "Supported Countries," Jul. 3, 2014, Jumio.

Zhuoran Wang et al., "Large-Margin Structured Prediction via Linear Programming", 12th International Conference on Artificial Intelligence and Statistics, Apr. 16, 2009, pp. 599-606, vol. 5, Clearwater Beach, Florida, USA.

Cheng-Lin Liu, "Partial discriminative training for classification of overlapping classes in document analysis," International Journal of Document Analysis and Recognition (IJDAR), Sep. 23, 2008, pp. 53-65, vol. 11, No. 2, Springer-Verlag, Berlin, Germany.

Shuang-Hong Yang et al., "Feature Selection by Nonparametric Bayes Error Minimization," May 22, 2007, Advances in Knowledge Discovery and Data Mining; (vol. 5012 of the series Lecture Notes in Computer Science), pp. 417-428.

George Saon et al., "Penalty Function Maximization for Large Margin HMM Training", Interspeech, Sep. 22, 2008, pp. 920-923.

Gal Chechik et al., "Max-margin Classification of Data with Absent Features", Journal of Machine Learning Research, Jan. 2008, pp. 1-21.

Christopher D. Manning et al., "Vector Space Classification", In: "Introduction to Information Retrieval", Apr. 1, 2009, pp. 289-317, Cambridge University Press, Cambridge, UK.

International Search Report and Written Opinion for PCT/IL2012/050265, mailed Mar. 22, 2013.

International Preliminary Report on Patentability for PCT/IL2012/050265, mailed Jan. 28, 2014.

* cited by examiner

SYSTEM AND METHODS FOR COMPUTERIZED MACHINE-LEARNING BASED AUTHENTICATION OF ELECTRONIC DOCUMENTS INCLUDING USE OF LINEAR PROGRAMMING FOR CLASSIFICATION

RELATED APPLICATIONS

The present application is a National Phase of International Application Number PCT/IL2012/050265, filed Jul. 23, 2012, which claims priority to U.S. Provisional Application No. 61/512,487, filed Jul. 28, 2011.

REFERENCE TO CO-PENDING APPLICATIONS

Priority is claimed from U.S. Patent Application No. 61/512,487 "System and methods for computerized machine-learning based authentication of electronic documents Including Use of Linear Programming for Classification", filed 28 Jul. 2011.

Related co-pending applications include:

PCT Application No. PCT/IL2010/000932 "Apparatus and methods for computerized authentication of electronic documents"; and PCT/IL2010/000933 "Computerized integrated authentication/document bearer verification system and methods useful in conjunction therewith".

FIELD OF THE INVENTION

The present invention relates generally to computerized analysis of electronic documents and more particularly to computerized sorting of electronic documents.

BACKGROUND OF THE INVENTION

Conventional computerized platforms are known which use processors to identify and authenticate electronically presented identification documents such as ID cards, driving licenses and passports. One possible implementation thereof is described in WIPO Patent Application WO/2011/058554, entitled "COMPUTERIZED INTEGRATED AUTHENTICATION/DOCUMENT BEARER VERIFICATION SYSTEM AND METHODS USEFUL IN CONJUNCTION THEREWITH".

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide a system and method for computerized machine-learning based authentication of electronic documents including use of linear programming for classification.

There is thus provided, in accordance with at least one embodiment of the present invention, a computerized method for electronic document classification, the method comprising:

providing training documents sorted into a plurality of classes;

using a processor to perform linear programming including selecting input values which maximize an output value, given specific constraints on the input values, wherein the output value maximized is a difference between:

a. a first estimated probability that a document instance will be correctly classified, by a given classifier corresponding to given input values, as belonging to its own class, and b. a second estimated probability that the document instance will be classified, by the given classifier, as belonging to a class other than its own class; and classifying electronic document instances into the plurality of classes, using at least one preferred classifier corresponding to the input values selected by the linear programming including storing an indication of the classifying in computer memory.

There is further provided, in accordance with at least one embodiment of the present invention, a system for electronic document classification operative in conjunction with training documents sorted into a plurality of classes, the system comprising:

computerized apparatus using a processor for performing linear programming including selecting input values which maximize an output value, given specific constraints on the input values, wherein the output value maximized is a difference between:

a. a first probability that a document instance will be correctly classified, by a given classifier corresponding to given input values, as belonging to its own class, and b. a second estimated probability that the document instance will be classified, by the given classifier, as belonging to a class other than its own class; and apparatus for classifying electronic document instances into the plurality of classes, using at least one preferred classifier corresponding to the input values selected by the linear programming.

Yet still further, in accordance with at least one embodiment of the present invention, the invention provides a computer program product, comprising a computer usable medium having a computer readable program code embodied therein, the computer readable program code adapted to be executed to implement a computerized method for electronic document classification, the method comprising:

providing training documents sorted into a plurality of classes;

using a processor to perform linear programming including selecting input values which maximize an output value, given specific constraints on the input values, wherein the output value maximized is a difference between:

a. a first estimated probability that a document instance will be correctly classified, by a given classifier corresponding to given input values, as belonging to its own class, and b. a second estimated probability that the document instance will be classified, by the given classifier, as belonging to a class other than its own class; and classifying electronic document instances into the plurality of classes, using at least one preferred classifier corresponding to the input values selected by the linear programming including storing an indication of the classifying in computer memory.

Further in accordance with certain embodiments of the present invention, some electronic document instances are classified as belonging to none of the plurality of classes.

Still further in accordance with certain embodiments of the present invention, the training documents sorted into a plurality of classes are sorted by a human supervisor and the own class comprises a class to which a training document belongs, as determined by the human supervisor.

Still further in accordance with certain embodiments of the present invention, each electronic document instance includes at least one digital scan, using at least one illumination, of a physical document.

Additionally in accordance with certain embodiments of the present invention, the classifying uses the preferred classifier in conjunction with available partial information regarding correspondence between electronic document instances and the plurality of classes.

Yet further in accordance with certain embodiments of the present invention, the partial information includes information read from an electronic document instance's machine readable zone.

Further in accordance with certain embodiments of the present invention, the input values comprise weights used to compute linear combinations of functions of features derived from individual electronic document instances.

Additionally in accordance with certain embodiments of the present invention, at least one feature derived from at least one individual electronic document instance characterizes a local patch within the individual electronic document instance.

Still further in accordance with certain embodiments of the present invention, at least one feature derived from at least one individual electronic document instance comprises a texture feature.

Further in accordance with certain embodiments of the present invention, at least one feature derived from at least one individual electronic document instance comprises a color moment feature.

Still further in accordance with certain embodiments of the present invention, at least one feature derived from at least one individual electronic document instance comprises a ratio between a central tendency of at a color characterizing at least a portion of the electronic document instance, and a measure of spread of the color.

Additionally in accordance with certain embodiments of the present invention, the color is expressed in terms of least one channel in a color space.

Further in accordance with certain embodiments of the present invention, each feature is associated with at least one k-nearest neighbors weak classifier.

Further in accordance with certain embodiments of the present invention, the method also comprises electronically determining whether each of a stream of electronic document instances are forgeries, by performing electronic forgery tests specific to individual classes from among the plurality of classes, on individual electronic document instances in the stream which have been classified by the preferred classifier, as belonging to the individual classes respectively.

Additionally in accordance with certain embodiments of the present invention, the functions include probabilities that an individual document instance belongs to a given class given that the individual document instance is characterized by a particular feature derived from individual electronic document instances.

Further in accordance with certain embodiments of the present invention, the constraints include at least one constraint whereby a pair of the linear combinations, corresponding to different classes, differ by at least a predetermined margin.

Additionally in accordance with certain embodiments of the present invention, the constraints include at least one constraint whereby a pair of the linear combinations, corresponding to different classes, differ by at least a predetermined margin but for a slack variable characterizing an individual electronic document and selected to be large if the individual electronic document is an outlier in its class.

Further in accordance with certain embodiments of the present invention, each electronic document instance includes a plurality of scans, using a plurality of illuminations, of a physical document.

Also provided is a computer program product, comprising a typically non-transitory computer usable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer. The term "processor" includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, whenever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching" "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF EMBODIMENTS

Figure 1:
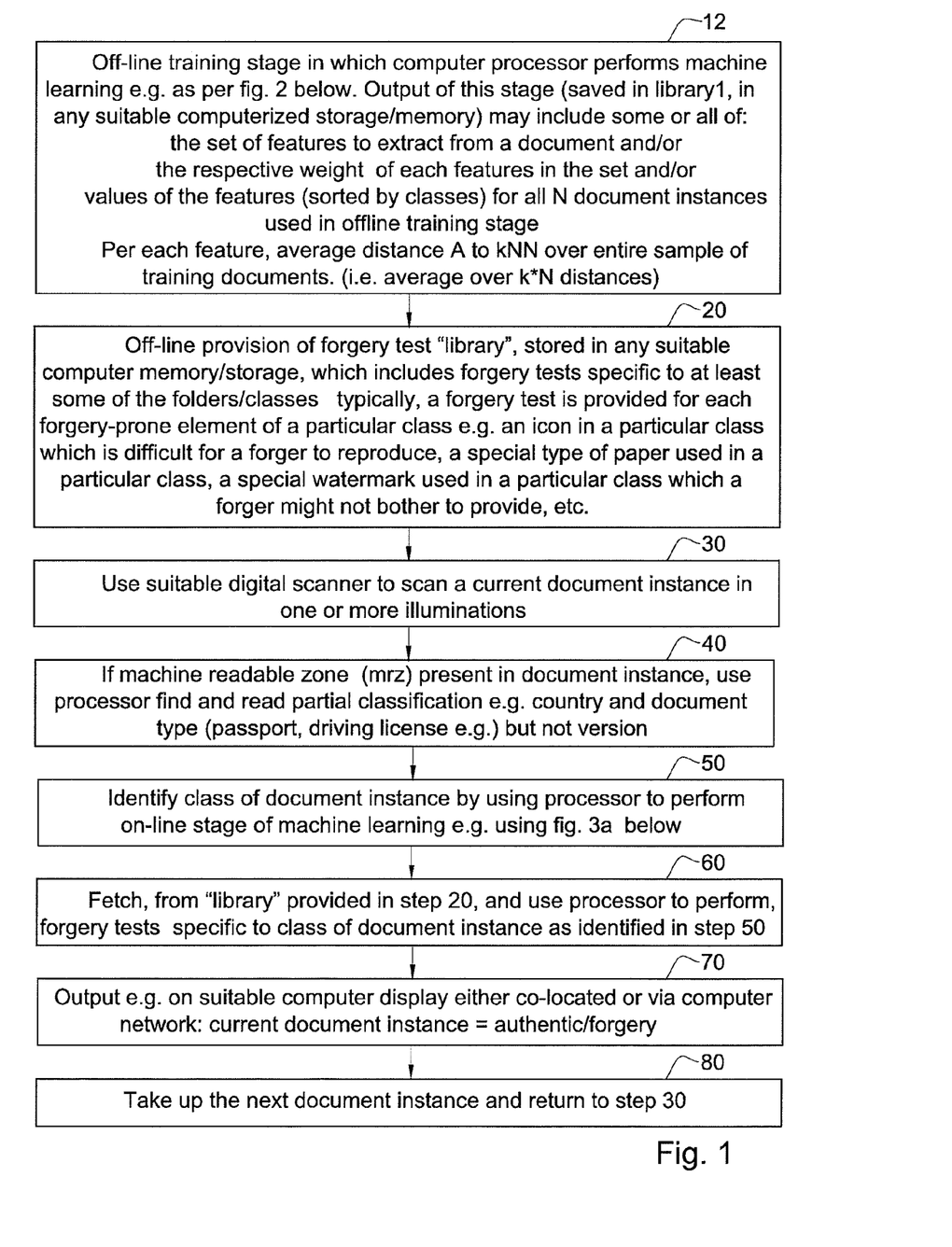
FIG. 1 is a simplified flowchart illustration of a method for machine-learning-based forgery detection in electronic documents, the method being constructed and operative in accordance with certain embodiments of the present invention.

Reference is now made to FIG. 1 which is a simplified flowchart illustration of a method for machine-learning-based forgery detection in electronic documents. The method of FIG. 1 typically comprises some or all of the following steps, suitably ordered e.g. as shown:

Step 12: off-line training stage in which computer processor performs machine learning e.g. as per FIG. 2 below. Output of this stage (saved in library1, in any suitable computerized storage/memory) may include some or all of:
the set of features to extract from a document and/or
the respective weight of each features in the set and/or values of the features (sorted by classes) for all N document instances used in offline training stage Per each feature, average distance A to kNN over entire sample of training documents. (i.e. average over k*N distances)

Step 20: off-line provision of forgery test "library", stored in any suitable computer memory/storage, which includes forgery tests specific to at least some of the folders/classes typically, a forgery test is provided for each forgery-prone element of a particular class e.g. an icon in a particular class which is difficult for a forger to. reproduce, a special type of paper used in a particular class, a special watermark used in a particular class which a forger might not bother to provide, etc.

Examples of forgery tests for step 20 of FIG. 1 include but are not limited to any or all of:

(1) a pattern that is seen only under UV illumination is missing (2) a repetitive pattern with fixed inter-distance occurs in a forged document with variable inter-distance (3) fine detail are missing from the pattern e.g., due to low quality printer (4) inconsistency in a passport between personal details and the corresponding fields in machine-readable-zone (MRZ)

(5) photo-replacement.

Step 30: use suitable digital scanner to scan a current document instance in one or more illuminations.

Step 40: if machine readable zone (mrz) present in document instance, use processor find and read partial classification e.g. country and document type (passport, driving license e.g.) but not version.

Step 50: identify class of document instance by using processor to perform on-line stage of machine learning e.g. using FIG. 3a below.

Step 60: fetch, from "library" provided in step 20, and use processor to perform, forgery tests specific to class of document instance as identified in step 50.

Step 70: output e.g. on suitable computer display either co-located or via computer network: current document instance=authentic/forgery.

Step 80: take up the next document instance and return to step 30.

Figure 2:
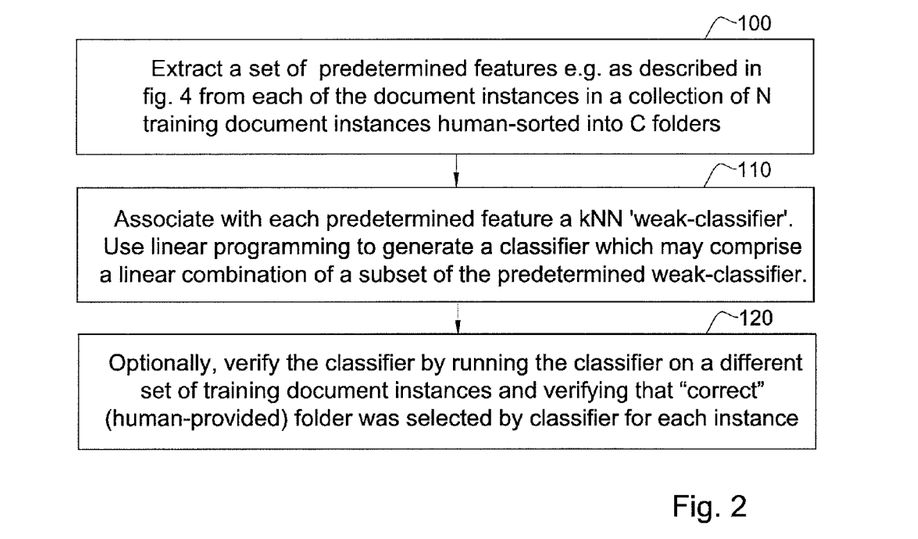
FIG. 2 is a simplified flowchart illustration of a method for off-line training in a context of machine learning, the method being constructed and operative in accordance with certain embodiments of the present invention.
Figure 4:
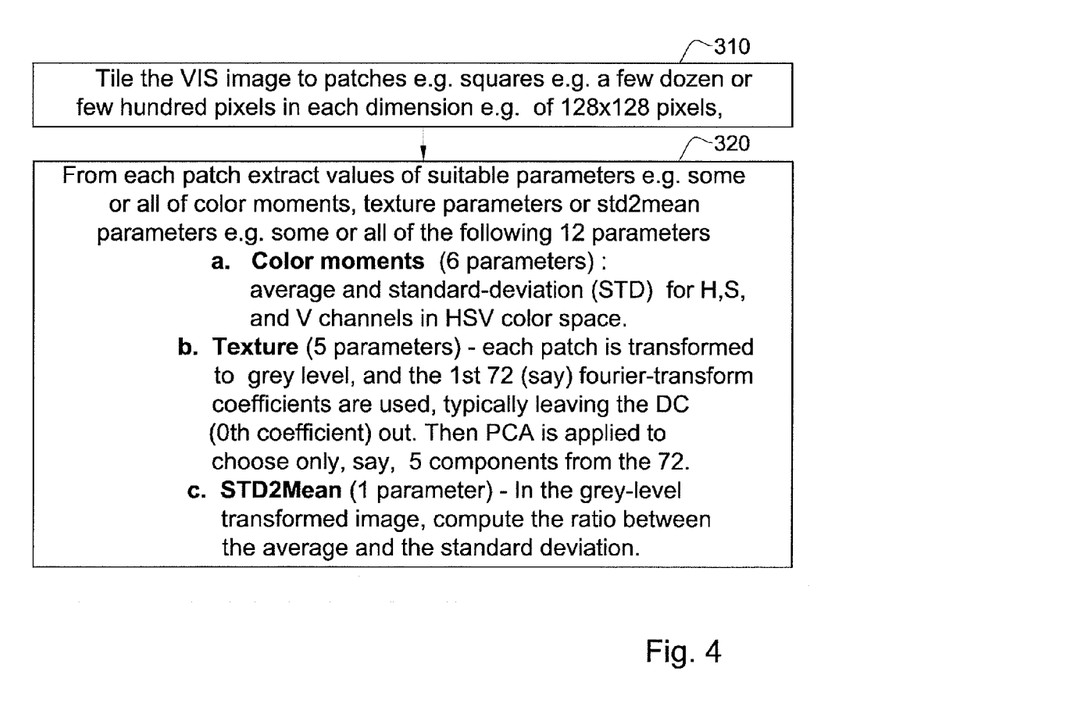
FIG. 4 is a simplified flowchart illustration of a method for feature extraction according to certain embodiments, the method being constructed and operative in accordance with certain embodiments of the present invention.

Reference is now made to FIG. 2 which is a simplified flowchart illustration of a method for off-line training in a context of machine learning. The method of FIG. 2 typically comprises some or all of the following steps, suitably ordered e.g. as shown:

Step 100. extract a set of predetermined features e.g. as described in FIG. 4 from each of the document instances in a collection of N training document instances human-sorted into C folders.

Step 110. use linear programming to generate a classifier which may comprise a linear combination of a subset of the predetermined features.

Step 120. optionally, verify the classifier by running the classifier on a different set of training document instances and verifying that "correct" (human-provided) folder was selected by classifier for each instance.

Figure 3A:
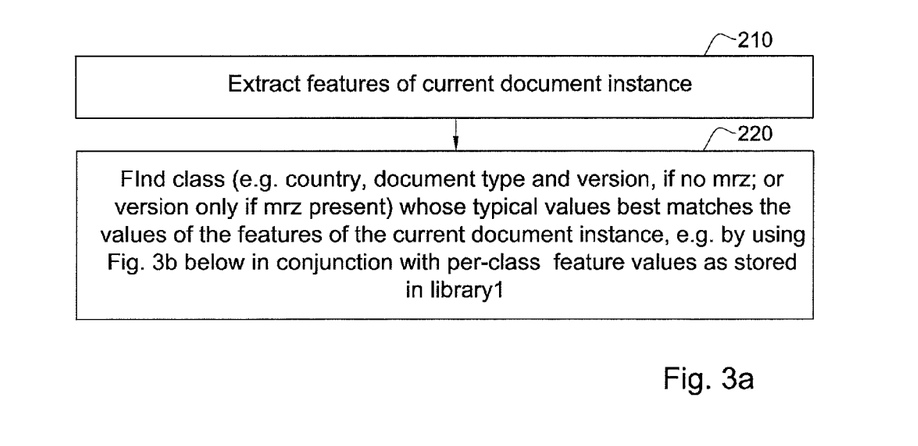
FIG. 3a is a simplified flowchart illustration of a method for on-line machine learning according to certain embodiments, the method being constructed and operative in accordance with certain embodiments of the present invention.

Reference is now made to FIG. 3a which is a simplified flowchart illustration of a method for on-line machine learning according to certain embodiments. The method of FIG. 3a typically comprises some or all of the following steps, suitably ordered e.g. as shown:

Step 210. use a processor to extract features of current document instance.

Step 220. use a processor to find class (e.g. country, document type and version, if no mmz; or version only if mrz present) whose typical values best matches the values of the features of the current document instance, e.g. by using FIG. 3b below in conjunction with per-class feature values as stored in library1.

Figure 3B:
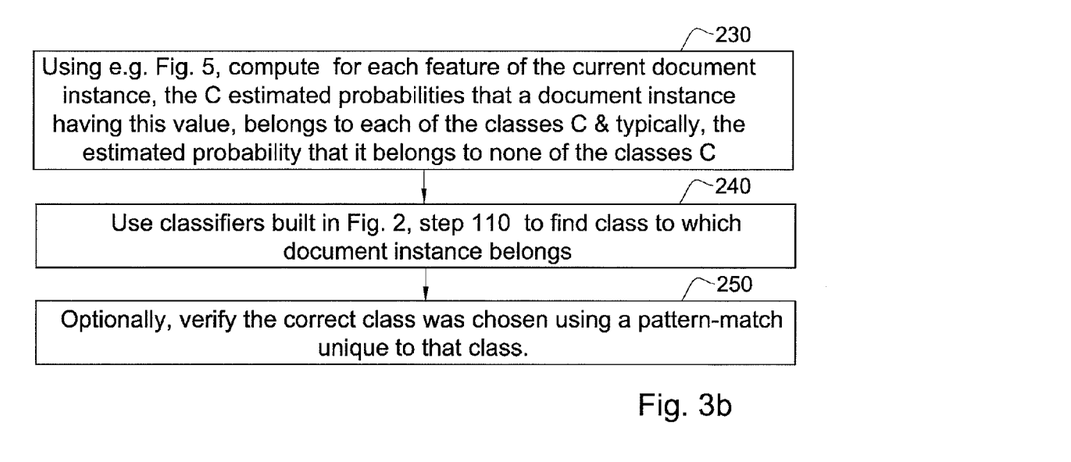
FIG. 3b is a simplified flowchart illustration of a method for finding a class to which a document instance belongs, the method being constructed and operative in accordance with certain embodiments of the present invention.
Figure 5:
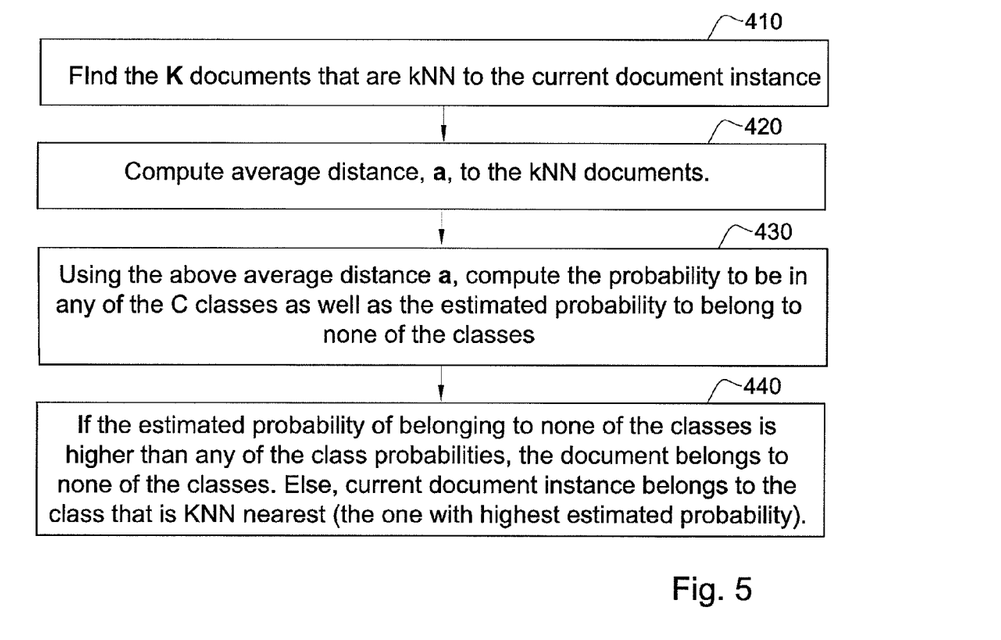
FIG. 5 is a simplified flowchart illustration of a method for computing a estimated probability that an electronic document belongs to a particular class of such, or to no known class of such, the method being constructed and operative in accordance with certain embodiments of the present invention.

Reference is now made to FIG. 3b which is a simplified flowchart illustration of a method for finding a class to which a document instance belongs. The method of FIG. 3b typically comprises some or all of the following steps, suitably ordered e.g. as shown:

Step 230. using e.g. FIG. 5, compute for each feature of the current document instance, the C probabilities that a document instance having this value, belongs to each of the classes C & typically, the estimated probability that it belongs to none of the classes C.

Step 240. use classifiers built in FIG. 2, step 110 to find class to which document instance belongs Reference is now made to FIG. 4 which is a simplified flowchart illustration of a method for feature extraction according to certain embodiments. The method of FIG. 4 typically comprises some or all of the following steps, suitably ordered e.g. as shown:

Step 310: Tile the VIS image to patches e.g. squares e.g. a few dozen or few hundred pixels in each dimension e.g. of 128×128 pixels, Step 320: From each patch extract values of suitable parameters e.g. some or all of color moments, texture parameters or std2mean parameters e.g. some or all of the following 12 parameters a. Color moments (6 parameters): average and standard-deviation (STD) for H,S, and V channels in HSV color space.

b. Texture (5 parameters)—each patch may be transformed to grey level, and the $1^{st}$ 200 (say) fourier-transform coefficients may be used, typically leaving the DC ($0^{th}$ coefficient) out. Then PCA may be applied to choose only, say, components from the 200.

c. STD2Mean (1 parameter)—In the grey-level transformed image, compute the ratio between the average and the standard deviation.

Reference is now made to FIG. 5 which is a simplified flowchart illustration of a method for computing a estimated probability that an electronic document belongs to a particular class of such, or to no known class of such. The method of FIG. 5 typically comprises some or all of the following steps, suitably ordered e.g. as shown:

Step 410: find the K documents that are kNN to the current document instance.

Step 420: Compute average distance, a, to the kNN documents.

Step 430: Using the above average distance a, compute the estimated probability to be in any of the C classes as well as the estimated probability to belong to none of the classes Step 440: If the estimated probability of belonging to none of the classes is higher than any of the class probabilities, the document belongs to none of the classes. Else, current document instance belongs to the class that is KNN nearest (the one with highest estimated probability).

Conventional computerized platforms are known which use processors to identify and authenticate electronically presented identification documents such as ID cards, driving licenses and passports. One possible implementation thereof is described in WIPO Patent Application WO/2011/058554, entitled "Computerized Integrated Authentication/Document Bearer Verification System And Methods Useful In Conjunction Therewith".

After scanning of a document instance the system may find its identity (classification, e.g., {French, passport, version 3}, or {UK, driving license, Version 2}) and then examines whether the document is forged. The stage of correctly identifying i.e. classifying the document instance is useful because the set of forgery tests may then be selected depending on the specific category to which the document instance belongs. The phase of identifying a document is termed classification because the system takes as an input the image of a document instance and outputs the class (type) of the document. Typically, more than one, e.g. 3 images are input for each document, as the scanner photographs the image in various illuminations which may include 2 or more of: Visual (VIS), Infrared (IR) and Ultraviolet (UV).

A Classification Process, in accordance with certain embodiments, is now described, which is useful, inter alia, in conjunction with the method of FIG. 1. Classification may be based on machine learning in which a computerized system 'learns' by examples as described herein. Machine learning typically comprises learning (or training) typically performed off-line and testing. For the learning stage and the testing stage two distinct sets of images may be used. The two sets typically do not overlap; the set used for training is typically disjoint with the set used for verifying e.g. as described herein). Each set may be divided by a supervisor (human) to folders, where each folder represents a different class. Subsequently, the system automatically analyzes each of the sets of documents and extracts and stores the parameters values that are associated with each folder/class. In run time, when an image is given as an input, the system extracts the parameter values of the image and determines, according to the values, what is the class of the document.

Classification may differ according to whether or not the document has a Machine Readable Zone (MRZ) (FIG. 3a). If the document has MRZ, then optionally, the system uses OCR to read from the MRZ the country and the document type (e.g., France; Permanent Resident Card). Subsequently, the system invokes the classifier to determine the document version. If the document does not have an MRZ, the system typically invokes the classifier to determine also document country and type, as well as document version.

The process of classification typically starts with a supervised (human) feed up of training data. The data typically comprises a set of document's images, where each document may have several images, e.g., three images corresponding to three illuminations: Visual (VIS), Infrared (IR), and Ultraviolet (UV). There may be two phases to this process, preparation and optimization (via linear programming) algorithms. During the preparation phase a set of feature values may be computed; during an optimization step a suitable e.g. "best" linear combination of features may be chosen that classifies a document to its correct class, typically so as to mimic as closely as is feasible, in an application-specific sense, the classification of a human operator.

The optimization is useful in certain embodiments in which two documents of the same class may differ from each other, but it is assumed that this difference is significantly less than the difference between two documents from distinct classes. According to these embodiments, a goal of optimization is that the estimated probability that a document belongs to its class, as computed by the classifier from the learning set, is as much higher as possible than the estimated probability that the document belongs to another class.

A CLASSIFIER—learning-process which may be performed offline in accordance with certain embodiments, and is useful e.g. in conjunction with the method of FIG. 2, is now described. Input may include a set of VIS images divided into C folders, where each folder represents a different class. Thus there are C different classes. Output may include one or more of:
   a. A set of features that will be used by the classifier.
   b. A set of weights for the linear combination of the above features.
   c. A threshold value for 'other'. "Other" symbolizes the case that the document in question does not belong to any known class.
   d. A database that stores the values of the subset features for all the documents used in the training stage, sorted per class.
   e. For each feature, A k-Nearest-Neighbors (kNN, e.g. as described below) distance-average over all documents in training set.

A Preparation phase provided in accordance with certain embodiments, and is useful e.g. in conjunction with the method of FIG. 3a and/or the method of FIG. 4, is now described in detail. Input may include a set of VIS images divided into C folders, where each folder represents a different class. Thus there are C different classes. Typically, documents are replicated as homogenously as possible in a folder that has less than k+1 samples, where k is the number of nearest neighbors in a kNN method, where k is a suitable integer, for instance k=7.

Output may include some or all of the following:
   i. A set of features e.g. as described below.
   ii. A set (having the size of the number of features) of vector values per each document, each vector of size C+1 (detailed explanation below), where each vector represents the estimated probabilities that the corresponding feature on the said document will yield any of the C classes or an outlier 'other'.
   iii. kNN (as described below) distance-average over all documents in training set FEATURES, each VIS image may be tiled to patches of a suitable size and shape, e.g. a square having a few dozen or few hundred pixels e.g., say, 128×128 pixels. The tiles typically overlap, e.g. by 50% along the X-axis. The following three parameters are typically extracted for each patch:
   a. Color moments (a multi-dimensional, e.g. 6-dimensions, parameter)—e.g. average and/or standard-deviation (STD) for some or all of several e.g. KS, and V channels in HSV (say) color space.
   b. Texture (a multi-dimensional, e.g. 5-dimensions, parameter)—for example, each patch may be transformed to grey level, and a suitable set of linear combinations of the image' fourier-transform coefficients may be used. E.g. start with set of highest 72 Fourier-transform coefficients leaving the DC ($0^{th}$ coefficient) out, and then conventional Principal-Component-Analysis (PCA) technology, say, may be applied to choose only some linear combinations of the above set, e.g. 5 linear combinations of the 72 coefficients.
   c. STD2Mean (1 dimension parameter)—typically, the patch is transformed to grey level and the ratio of the standard deviation is divided by the average.

The combination of a patch+a parameter (such as Texture, Color-moment or Std2Mean) may be deemed a feature. Thus for the above 3 parameters the total number of features per document is: 3×# of patches. While the same features are used on all documents, the feature values typically differ between the documents.

Each feature is typically associated in each document class or instance with a k-nearest-neighbors (kNN) 'weak' classifier, e.g. with k=7. Using the kNN weak-classifier, the system computes for each feature on each document, the estimated probability (e.g. as described below) that a current document instance belongs to a class c due to a current feature, where c=1 ... C. Optimally, the estimated probability for the class to which the document belong should be 1, and 0 for all the other classes. Alternatively or in addition, the weak classifier typically determines the estimated probability that the classification will yield the class 'OTHER'. Other takes into account the possibility that, during the training stage, a document that does not belong to any of the existing classes was mistakenly placed in one of the folders, e.g. because the document resembles one of the existing classes or it is forged and hence differs from an authentic one, or a document that belongs, say, to class1 was mistakenly placed in class 2. The estimated probability that a feature f from document j results in class c may be computed using a weak-classifier, e.g. as per FIG. 5, as follows:

a. For the feature f, compute the average Euclidean distance to kNN over the whole sample (irrespective of class). So, if we have total of N instances, the average will be over k*N distances. Call this average A
b. For the feature f from document j, find the K documents that are kNN to the feature.
c. Compute the average distance to the K documents. Call this average a.
d. The estimated probability to be 'other' is $$P_{other} = 1/1 + \exp(t-a/A) \quad (1)$$

Where t is a threshold set to a suitable application-specific value e.g. 10.
e. Find from the K documents how many are in class c—call this $K_c$ ($K_c$ is between 0 ... K). The estimated probability to be in class c due to feature f is $(1-P_{other}) *K_c/K$.

Linear Programming according to certain embodiments, which embodiments are useful e.g. in conjunction with step 110 in FIG. 2 and/or step 240 of FIG. 3b, is now described.
INPUT may include some or all of
a. A set of features
b. A set, e.g. as per FIG. 5, (having the size of the number of features) of vector values per each document, each vector of size C+1, where each vector represents the estimated probabilities that the corresponding feature on the said document will yield any of the C classes or an outlier 'other'.

OUTPUT may include some or all of:
a. A set of weights which may be used for the classifier. The classifier may be defined as a linear combination of the weak-classifiers:

$$\text{Classifier} = \sum_{i=1}^{F} w_i wc_i$$

where, for each i, cw is the weak-classifier and w is the weight.
b. The values of the features for which w>0, in all the documents.

Typically, the method is operative to find a linear combination (i.e., the values of all w's) which enhances e.g. maximizes the ability of the classifier to correctly match a document with its class. The ability may be verified in the running stage e.g. as described below, where the system puts in folders on the set of images that belong to the testing stage, and the division into folders is then compared against what was prepared by the supervisor.

This may be achieved by use of computerized Linear Programming to maximize a linear function subject to set of linear inequalities. The linear inequalities may contain unknown variables, and the output includes values of the unknowns that maximize the linear function. In this embodiment the unknown variables may include some or all of the set of w's in the linear combination that determine the classifier.

The number of constraints may equal the total number of training documents* (C−1). For each document in the training set, it may be desired that the estimated probability that it will belong to its class, as computed from the training set, will be higher than the probability that it will belong to another class. Thus, for any document k in class m, and for any class m and n (n≠m), the following constraint may be employed in the computerized linear programming process:

$$\sum_{i=1}^{F} w_i (P_i^m(D_k^m) - P_i^n(D_k^m)) - M + \varepsilon_k^m \geq 0,$$

$$m \neq n$$

Where:
a. F=num of features (or classifiers)
b. $w_i$=the weight of feature i—this is typically included in the output of Linear Programming. Typically:

$$\sum_{i=1}^{F} w_i = 1,$$

$$0 \leq w_i \leq 1$$

c. $D_k^m$—a document k from class m
d. $P_i^m$=the estimated probability that a document belongs to class m due to feature i (e.g. as computed by kNN nearest neighbors in step 'e' of the above-described method for computing the estimated probability that a feature f from document j results in class c using a weak-classifier)
e. $P_i^n$=the estimated probability (as computed by kNN nearest neighbors in step 'e' in Preparation) that a document belongs to class n (n≠m) due to feature i.
f. M=the 'margin' between two documents from different sets: by how much two documents from different sets should at least differ. The margin may be particularly useful for documents characterized in that their feature values lie just on the borders between the two classes, for if the inequality is fulfilled for these, it will a fortiori be fulfilled for documents that are far from the boundary.
g. $\epsilon_k^m$ ($\epsilon_k^m$>0)—slack variable for document from class m. The slack variable takes care of the case that the document is an outlier—lies away from the center (in feature space) where most of the documents are. In particular the document may be an 'other'. The slack variable if provided, takes care of this by reducing the margin for the document.

In addition to the above constraints that contain unknown variables, the w's, there may be additional constant constraints that are not necessarily maximized: individual w should be smaller than a predetermined application-specific value, say 0.3, the sum of the colour moments is smaller than a predetermined application-specific value, say 0.25 and the sums of the std/mean are not greater than a predetermined application-specific value, say 0.15

The following linear function may be maximized using conventional computerized linear programming techniques on the electronic document data described herein, which data is typically computed from scanned representations of electronic documents which may in turn be generated by any suitable document scanner:

$$M - \beta \sum_{m,k} \frac{1}{CN_m} \varepsilon_k^m \geq 0$$

where m=1 ... C, k=1 ... $N_m$, C is the number of classes, $N_m$ is the number of samples in class m, β is fixed to a suitable application-specific value such as 10. Maximization of the linear equation makes the margin as large as possible by requiring that the accumulative values of the slack variables will be low.

Linear programming maximizes the linear function by varying: (a) M, (b) the weights of the features and (c) the slack variables. In many applications, the result of optimization is that most $w_i$ are equal to 0, which means that only a small set of features are used in classification.

After the linear programming, inspect the values of ε's. Any ε's with value>0.5*M indicate that the corresponding document is an 'other' relative to that class. If this document belonged to another class within the C classes—put it there; otherwise remove it from the training set. If any document was removed or put (physically or virtually) in another folder, repeat the preparation and Linear Programming phases.

A Classifier running stage provided in accordance with certain embodiments is now described, which is useful e.g. in conjunction with FIG. 5 herein.

Input may comprise some or all of:—
  a. The values of the features for which w>0, in all the documents of the learning phase.
  b. A document that we want to classify and the values of all features with (w>0)

Output may comprise the class to which this document belongs or 'other' to indicate that the document belongs to none of the classes.

The procedure typically includes computation of the estimated probability that the document belongs to any class m or to other by $$P(m) = \sum_{i=1}^{F} \alpha_i (P_i^m),$$

$$P(\text{other}) = \sum_{i=1}^{F} \alpha_i (P_i^{other})$$

Where Pr is the estimated probability that the document will belong to class m due to feature i (as computed by kNN in step 'e' in Linear Programming).
  a. Consider the class that obtains the maximal estimated probability among all the classes. If the estimated probability is higher than the estimated probability to be other, then output this class. Otherwise, output 'other'.
  b. Optionally, if the output is not other, verify the correct class is chosen by a pattern match that is unique to this class.

A computerized Forgery feature fine-tuning method, typically performed offline in conjunction with certain embodiments and useful e.g. in conjunction with the method of FIG. 1, is now described. According to certain embodiments, a suitable set of features is used for forgery detection and for matchup of a relevant sub-set of features per document. Below is a detailed description of example features for some forgeries, sorted per illumination:

IR:
1. The IR illumination may have most of the textual information seen in VIS illumination. An IR with few textual information is suspected as forged. Typically, the grey level standard deviation and entropy are computed. If the standard deviation is less than a predetermined application-specific threshold, say, 17.6 and the entropy is less than a predetermined application-specific threshold, say, 5.7, the image is forged. Entropy may be computed using the following formula:

$$\text{Entropy} = -\sum_{i=1}^{N} p_i \log_2^{p_i},$$

$$\sum_{i=1}^{N} p_i = 1$$

where $P_i$ is the discrete grey level distribution, and N is the number of distinct grey level values.

VIS:
2. Check for Photo-Replacement. In some cases there are patterns that appear on both the photo and the background. If the photo was replaced, it may be hard to match the patterns. Thus typically, the continuity of the pattern on the border between the background and the photo, is checked.

UV
3. In case of forgery, sometimes a paper that is not suited for UV illumination is used. In that case, the document may be bright under UV illumination. Thus an unusual bright image in UV illumination may be an indication for forgery.
4. Brightness of photo area—indication for Photo Replacement
5. UV pattern, especially symmetry in UV pattern e.g. as described below. A particular feature of certain embodiments of the present invention is that symmetries in UV illuminations are exploited, particularly when conventional methods such as pattern match fail. Conventional methods such as pattern match are generally not useful because the UV image is often unstable, much less stable than the VIS image, so that pattern-matching to an original document tends to fail. Using symmetry, a repetitive pattern found in the current document is exploited to look for forgeries in which such repetitive patterns are often poorly reproduced leading to detectable differences between expected repeating instances within the pattern of a known document type.

Example methods for utilizing symmetries present in UV patterns to detect forgeries, according to certain embodiments, are now described. Passports and identity cards are often supplemented with a pattern visible only under UV illumination. This pattern serves as a security feature to detect fraud documents. A recurring theme in many of these UV images is a repeating pattern which can be robustly characterized by the period of repetition.

The system, according to certain embodiments, converts the color images to gray-level images, filters and normalizes the input images in order to attenuate global illumination changes and account for wearing of the pattern over time. The system typically measures the dominant period of repetition e.g. by computing the autocorrelation of the normalized image. The autocorrelation image reduces much of the noise present in the original image and tends to have a strong peak in the position of the dominant period. Efficient computation of the autocorrelation is typically performed in the frequency domain by using the Fourier-transform of the image. The coordinates of the maximum value are typically computed in a predefined region. The average and standard-deviation of distance between the coordinates may be learned off-line on a training set of authentic documents and saved in a data-base. A document in question is deemed as forged if the average distance between the coordinates of the repetitive pattern as compared to an authentic document differs by more than, say, one standard-deviation, and/or if the standard-deviation itself is higher than, say, 1.5 times the standard-deviation found in an authentic document.

This process may be extended further to other geometric symmetries such as:

a. repeating lines, for which the angle and distance between lines may be measured. The angle in this case may be detected using Hough transform on the autocorrelation image, the distance may be measured by projecting the image in the direction of the angle detected.

b. angular periodicities e.g. about a center of a generally circular pattern such as flower with repeating "petals". In the case of a circular period, the center of the pattern may be found, the image may be warped to polar coordinates around the center and the autocorrelation may be computed as previously stated.

c. the case where a pattern appears in different sizes. Here autocorrelation may be performed against an image that may be scaled by a value that may be learned off-line.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable-code, having embodied therein, and/ or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry CPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A computerized method for electronic document classification, the method comprising:
   providing training documents sorted into a plurality of classes;
   using a processor to perform linear programming including selecting input values which maximize an output value, given specific constraints on the input values,
   wherein the output value maximized is a difference between:
      a. a first estimated probability that a document instance will be correctly classified, by a given classifier corresponding to given input values, as belonging to its own class, and
      b. a second estimated probability that the document instance will be classified, by the given classifier, as belonging to a class other than its own class; and
   classifying electronic document instances into the plurality of classes, using at least one preferred classifier corresponding to the input values selected by said linear programming including storing an indication of said classifying in computer memory,
   wherein some electronic document instances are classified as belonging to none of the plurality of classes.

2. A method according to claim h wherein said training documents sorted into a plurality of classes are sorted by a human supervisor and said own class comprises a class to which a training document belongs, as determined by the human supervisor.

3. A method according to claim 1, wherein each electronic document instance includes at least one digital scan, using at least one illumination, of a physical document.

4. A method according to claim 1, wherein said classifying uses said preferred classifier in conjunction with available partial information regarding correspondence between electronic document instances and the plurality of classes.

5. A method according to claim 4, wherein said partial information includes information read from an electronic document instance's machine readable zone.

6. A computerized method for electronic document classification, the method comprising:
   providing training documents sorted into a plurality of classes;
   using a processor to perform linear programming including selecting input values which maximize an output value, given specific constraints on the input values,
   wherein the output value maximized is a difference between:
      a. a first estimated probability that a document instance will be correctly classified, by a given classifier corresponding to given input values, as belonging to its own class, and
      b. a second estimated probability that the document instance will be classified, by the given classifier, as belonging to a class other than its own class; and
   classifying electronic document instances into the plurality of classes, using at least one preferred classifier corresponding to the input values selected by said linear programming including storing an indication of said classifying in computer memory,
   wherein said input values comprise weights used to compute linear combinations of functions of features derived from individual electronic document instances.

7. A method according to claim 6, wherein at least one feature derived from at least one individual electronic document instance characterizes a local patch within the individual electronic document instance.

8. A method according to claim 7, wherein at least one feature derived from at least one individual electronic document instance comprises a texture feature.

9. A method according to claim 7, wherein at least one feature derived from at least one individual electronic document instance comprises a color moment feature.

10. A method according to claim 7, wherein at least one feature derived from at least one individual electronic document instance comprises a ratio between a central tendency of at a color characterizing at least a portion of the electronic document instance, and a measure of spread of the color.

11. A method according to claim 10, wherein said color is expressed in terms of least one channel in a color space.

12. A method according to claim 1, wherein each feature is associated with at least one k-nearest-neighbors weak classifier.

13. A computerized method for electronic document classification, the method comprising:
   providing training documents sorted into a plurality of classes;
   using a processor to perform linear programming including selecting input values which maximize an output value, given specific constraints on the input values,
   wherein the output value maximized is a difference between:
      a. a first estimated probability that a document instance will be correctly classified, by a given classifier corresponding to given input values, as belonging to its own class, and
      b. a second estimated probability that the document instance will be classified, by the given classifier, as belonging to a class other than its own class; and
   classifying electronic document instances into the plurality of classes, using at least one preferred classifier corresponding to the input values selected by said linear programming including storing an indication of said classifying in computer memory; and
   electronically determining whether each of a stream of electronic document instances are forgeries, by performing electronic forgery tests specific to individual classes from among said plurality of classes, on individual electronic document instances in said stream which have been classified by said preferred classifier, as belonging to said individual classes respectively.

14. A method according to claim 6, wherein said functions include probabilities that an individual document instance belongs to a given class given that the individual document instance is characterized by a particular feature derived from individual electronic document instances.

15. A method according to claim 14, wherein said constraints include at least one constraint whereby a pair of said linear combinations, corresponding to different classes, differ by at least a predetermined margin.

16. A method according to claim 14 wherein said constraints include at least one constraint whereby a pair of said linear combinations, corresponding to different classes, differ by at least a predetermined margin but for a slack variable characterizing an individual electronic document and selected to be large if the individual electronic document is an outlier in its class.

17. A method according to claim 3, wherein each electronic document instance includes a plurality of scans, using a plurality of illuminations, of a physical document.

18. A method according to claim 1, wherein at least one classifier for at least one document is obtained by:
   tiling a visible (VIS) image of said document to patches, and
   from each of said patches, extracting values of parameters including at least color moments; and
   performing forgery testing of said instances using, for at least one individual document classified into an individual class from among said plurality of classes, at least one forgery test specific to said individual class.

19. A method according to claim 1, wherein at least one classifier for at least one document is obtained by:
   tiling a visible (VIS) image of said document to patches, and
   from each of said patches, extracting values of parameters including at least one texture parameter generated by transforming each patch to grey level, and computing at least one linear combination of the resulting gray image's highest fourier-transform coefficients; and
   performing forgery testing of said instances using, for at least one individual document classified into an individual class from among said plurality of classes, at least one forgery test specific to said individual class.

20. A method according to claim 1, wherein at least one classifier for at least one document is obtained by:
   tiling a visible (VIS) image of said document to patches, and
   from each of said patches, extracting values of parameters including at least an std2mean parameter generated by computing a ratio between average and standard deviation in a grey-level transformed image of said document; and
   performing forgery testing of said instances using, for at least one individual document classified into an individual class from among said plurality of classes, at least one forgery test specific to said individual class.

21. A method according to claim 1, wherein at least one estimated probability that an electronic document belongs to a particular class of documents, or to no known class thereof is computed by:
   finding K documents that are the nearest neighbors to the current document instance;
   computing an average distance to said K documents; and
   using said average distance to compute an estimated probability to be in any of C classes and an estimated probability to belong to none of the C classes.

22. A method according to claim 7, wherein at least one feature derived from at least one individual electronic document instance comprises at least one color moment feature including at least averages for at least H and S channels in hue-saturation-value (HSV) color space.

23. A method according to claim 13, wherein said classes include versions of individual document types and forgery testing is differentially performed for different versions.

* * * * *